(12) United States Patent
Ibe

(10) Patent No.: US 6,419,261 B1
(45) Date of Patent: Jul. 16, 2002

(54) AIRBAG APPARATUS

(75) Inventor: Shoichi Ibe, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/710,863

(22) Filed: Nov. 14, 2000

(30) Foreign Application Priority Data

Nov. 19, 1999 (JP) .............................. 11-329807

(51) Int. Cl.$^7$ .............................................. B60R 21/16
(52) U.S. Cl. .................................... 280/728.2; 280/731
(58) Field of Search ..................... 280/728.2, 728.3, 280/731

(56) References Cited

U.S. PATENT DOCUMENTS

| | | | | |
|---|---|---|---|---|
| 5,409,256 A | * | 4/1995 | Gordon et al. | 280/728 A |
| 5,577,768 A | * | 11/1996 | Taguchi et al. | 280/735 |
| 5,580,082 A | * | 12/1996 | Shiga et al. | 280/728.3 |
| 5,615,907 A | * | 4/1997 | Stanger | 280/728.2 |
| 5,636,859 A | * | 6/1997 | Williams et al. | 280/728.2 |
| 5,762,364 A | * | 6/1998 | Cuevas | 280/731 |
| 5,775,725 A | * | 7/1998 | Hodac et al. | 280/728.2 |
| 5,782,481 A | * | 7/1998 | Magoteaux | 280/728.2 |
| 5,816,608 A | * | 10/1998 | Tanabe | 280/728.2 |
| 5,829,777 A | * | 11/1998 | Sakurai et al. | 280/728.2 |
| 5,833,262 A | * | 11/1998 | Fujita et al. | 280/728.2 |
| 5,904,366 A | * | 5/1999 | Nishjima et al. | 280/728.2 |
| 6,036,222 A | * | 3/2000 | Holmes et al. | 280/728.2 |
| 6,053,528 A | * | 4/2000 | Marx et al. | 280/728.3 |
| 6,079,737 A | * | 6/2000 | Isomura et al. | 280/731 |
| 6,092,832 A | * | 7/2000 | Worrell et al. | 280/728.2 |
| 6,173,987 B1 | * | 1/2001 | Terasawa et al. | 280/728.2 |
| 6,186,535 B1 | * | 2/2001 | Sugiyama et al. | 280/728.2 |
| 6,196,573 B1 | * | 3/2001 | Worrell et al. | 280/728.2 |
| 6,199,908 B1 | * | 3/2001 | Isomura et al. | 280/777 |

FOREIGN PATENT DOCUMENTS

| | | |
|---|---|---|
| JP | 10-129385 | 5/1998 |
| JP | 11-048895 | 2/1999 |

* cited by examiner

*Primary Examiner*—Paul N. Dickson
*Assistant Examiner*—Deanna Draper
(74) *Attorney, Agent, or Firm*—Nixon Peabody LLP; Thomas W. Cole

(57) ABSTRACT

An airbag apparatus is obtained in which a pad cover can be securely supported onto a base member and the manufacturing work is also facilitated. Hook-shaped engagement protrusions or tongue shaped insertion portions are formed interchangeably on a side wall portion of a bag holder which fixes an inflator and a bag. Correspondingly, engagement openings or support walls are formed interchangeably on the mounting portion of the pad cover which unfolds when the vehicle decelerates rapidly. When both parts are fit together, the engagement protrusions are engaged with the engagement openings and the insertion portions are inserted between the support walls and the mounting portions. As a result, when the pad cover unfolds, the pad cover does not come off from the bag holder and the manufacturing work is facilitated because the support walls and the mounting portions which hold the insertion portions are formed of a resin.

7 Claims, 6 Drawing Sheets

AIRBAG APPARATUS

BACKGROUND OF THE INVENTION

1. Field of the Invention

The present invention relates to an airbag apparatus in which a pad-side mounting leg portion of a pad cover is affixed to a base-side mounting leg portion of a base member.

2. Description of the Related Art

Generally, an airbag apparatus for a driver seat comprises: a bag holder which is supported by a steering wheel; an inflator which is affixed to the bag holder and which ejects gas when a vehicle decelerates rapidly; a bag which is kept in a folded state in the vicinity of the inflator; and a pad cover which houses the bag and the inflator between the bag holder and itself, and breaks open and unfolds when a bag inflation pressure which exceeds a predetermined value is exerted.

Conventionally, the pad cover is affixed to the bag holder as described below. That is, as illustrated in FIG. 6, a plate lock 102 is provided to the surface of the bag holder 100 at the side opposite to the vehicle occupant side. The leg portion for mounting 110 which is configured so as to protrude to the back surface of the pad cover 108 is nipped between the support leg portion 104 of the bag holder 100 and the nipping portion 106 of the plate lock 102. The bag holder 100, the plate lock 102 and the pad cover 108 are fixed in this state by fixing means such as bolts, nuts and the like. Incidentally, the plate lock 102 is mainly used in the four-spoke type steering wheel, and a bracket is used in the three-spoke type steering wheel. Adopting the above-described structure ensures that when the pad cover unfolds, the unfold load is supported by the bag holder 100 and the pad cover 108 is thereby prevented from flying off.

However, in the case of the above structure, the leg portion for mounting 110 of the pad cover 108 is held by two members, namely, the support leg portion 104 of the bag holder 100 and the nipping portion 106 of the plate lock 102. As a result there is the disadvantage that the number of parts are increased and thereby cost is increased.

A structure in which the effect of the above-described structure is attained with one member is disclosed in Japanese Laid-Open No. 11-48895, and is briefly described below.

In the airbag apparatus disclosed in this publication, a plurality of cover mounting portions which are equivalent to the nipping portion of the above-described plate lock, are formed integrally with a side wall portion of the base plate which is equivalent to the above-described bag holder. The mounting wall portion is provided at the covering body, which is equivalent to the pad cover. By the mounting wall portion of the covering body being inserted between the side wall portion of the base plate and the cover mounting portion, the side wall portion of the base plate and the cover mounting portion are claw-fit together with the mounting wall portion of the covering body.

However, in the case of the airbag apparatus disclosed in the above-mentioned publication, because the two wall portions (i.e., the side wall portion and the cover mounting portion) which are disposed so as to be in close proximity to and parallel with each other must be formed integrally with a base plate formed of metal, accurate manufacturing work of the air bag entails difficulty.

SUMMARY OF THE INVENTION

In light of the above, an object of the present invention is to provide an airbag apparatus in which a pad cover can be securely supported on a base member and the manufacturing work is facilitated.

In the first aspect of the present invention, an airbag apparatus comprises: a high rigidity base member including a base portion to which an inflator which ejects gas when a vehicle rapidly decelerates and a bag which is inflated by the gas are fixed, and a base-side mounting leg portion which is provided at the base portion; and a pad cover formed of resin including a top portion which houses the bag between the base portion of the base member and the top portion, and is provided with an unfolding portion which breaks open and unfolds when an inflation pressure exerted by the bag exceeds a predetermined value, and a pad-side mounting leg portion which is affixed to the base-side mounting leg portion provided on a surface which is opposite to a vehicle occupant side of the top portion; wherein said airbag apparatus further comprises: an engagement mechanism which engages the pad-side mounting leg portion and the base-side mounting leg portions with each other; an obstruction mechanism which includes: spaces which are formed between the pad-side mounting leg portion and support walls provided at the pad-side mounting leg portion and; insertion portions, which are inserted into the spaces provided on the base-side mounting leg portion; such that a releasing of an engagement state of the pad-side mounting leg portion and the base-side mounting leg portion, due to elastic deformation in an unfolding direction of the unfolding portion of the pad cover, is prevented.

The second aspect of the present invention is the airbag apparatus of the first aspect wherein, the engagement mechanism is formed of engagement protrusions which are formed on one of the base-side mounting leg portion and the pad-side mounting leg portion, and engagement openings which are formed on the other of the base-side mounting leg portion and the pad-side mounting leg portion, such that the engagement protrusions can engage with engagement openings.

The third aspect of the present invention is the airbag apparatus of the first aspect wherein, the base end portions of the support walls are integrally formed with the surface which is opposite to the vehicle occupant side of the pad cover.

The fourth aspect of the present invention is the airbag apparatus of the first aspect wherein, the obstruction mechanism obstructs the movement of the insertion portion in directions orthogonal to the engagement and removal directions of the pad-side mounting leg portion and the base-side mounting leg portion.

The fifth aspect of the present invention is the airbag apparatus of the second aspect, further comprising a guide member which guides the engagement of the pad cover and the base member.

The sixth aspect of the present invention is the airbag apparatus of the fifth aspect wherein, the guide member is a taper portion which is provided at a distal end portion of the pad-side mounting leg portion, and guides the engagement of the engagement protrusion formed at the base-side mounting leg portion with the engagement holes formed at the pad-side mounting leg portion.

The seventh aspect of the present invention is the airbag apparatus of fifth aspect wherein, the guide member is a triangular engagement protrusion, when viewed from the side, which is formed on the pad-side mounting leg portion, and guides the engagement of the engagement protrusion with the engagement hole which is formed on the base-side mounting leg portion.

The eighth aspect of the present invention is the airbag apparatus of fifth aspect wherein, both end portions, in a pad cover circumferential direction, of at least one of the support walls are affixed to pad-side mounting leg portion.

According to a first aspect, when the airbag is in a state in which it is not actuated, the pad-side leg for mounting and the base-side leg for mounting are in a state in which they are engaged with each other by the engagement mechanism. Accordingly, in this state, there is no possibility that the pad cover will come apart from the base member.

When there is a rapid deceleration of the vehicle, gas is ejected from the inflator and the bag which is in a folded state is inflated by this gas. At this time, when the bag inflation pressure exceeds a predetermined value, the unfolding portions which are provided at the top portion of the pad cover break open and are unfolded. At this time, the pad-side mounting leg portion also receives force in the unfolding direction from the unfolding portion, and because it attempts to elastically deform in the unfolding direction, there is a possibility that the state in which the pad-side mounting leg portion and the base-side mounting leg portion are engaged by the engaging means, may be released.

However, in the present invention, the insertion portions of the base-side mounting leg portion are inserted into spaces formed between the pad-side mounting leg portion and support walls formed thereto. Thus when the pad-side mounting leg portion attempts to elastically deform in the direction in which the unfolding portion unfolds, the support walls and the insertion portions interfere with each other. As a result, the state in which base-side mounting leg portion and the pad-side mounting leg portion are engaged is prevented from being released.

In view of the above, in the present invention, secure mounting of the pad cover to the base member is ensured, and when there is a rapid deceleration of the vehicle, the pad cover which unfolds is securely supported by the base member.

Further, in the present invention, the pad-side mounting leg portion and the support walls provided thereto, achieve the role of the two wall portions in the prior art. That is to say, in the present invention, by providing two wall portions to the pad cover which is formed of a resin, the manufacturing work is considerably facilitated when compared with the case in which, the two wall portions are provided to a very hard (for example metal) base member.

According to the second aspect, an engagement mechanism is formed of: engagement protrusions formed on one of the base-side mounting leg portion or the pad-side mounting leg portion; and engagement openings formed on the other one (of the base-side mounting leg portion and the pad-side mounting leg portion) and to which the engagement protrusions can be engaged. As a result of this structure, in a case where the engagement protrusions are formed on the base-side mounting leg portion, because the base member is very hard, when the engagement protrusions engage with the engagement openings, they are in a state in which they are firmly fixed. On the other hand, in a case where the engagement protrusions are formed on the pad-side mounting leg portion, only the engagement openings are formed on the base-side mounting leg portion. Even in a case in which the base member is formed of metal, in order to form the engagement openings it is sufficient to just carry out the hole punching operation, and the operation of bending in order to form the engagement protrusion becomes unnecessary.

According to the third aspect, because the base end portion of the support walls which are provided on the pad-side mounting leg portion is integrally formed with the back surface of the top portion of the pad cover, the strength of the support walls is increased.

DESCRIPTION OF THE PREFERRED EMBODIMENTS

The First Embodiment

The first embodiment of the present invention will be described with reference to FIGS. 1 through 3.

Figure 3:
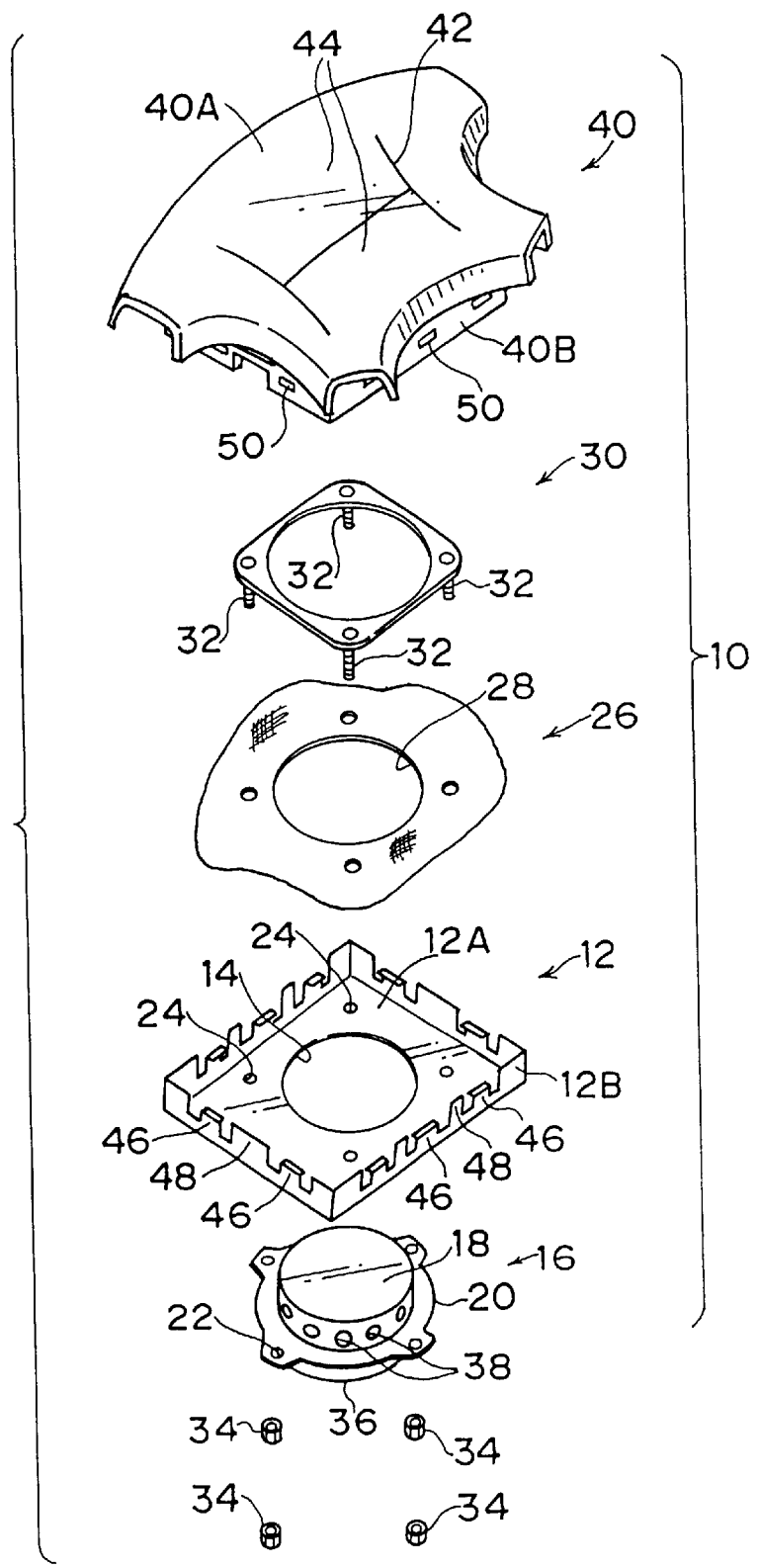
FIG. 3 is an exploded perspective diagram illustrating the entire structure of the airbag apparatus according the first embodiment.

FIG. 3 is an enlarged perspective diagram of the airbag apparatus 10 for a driver seat in the present embodiment. As illustrated in FIG. 3, the airbag apparatus 10 is provided with a bag holder 12 as a "base member", is supported by the hub of the steering wheel and formed of a metal material so as to have a high strength. The bag holder 12 is composed of a base portion 12A which is formed in a substantially rectangular plate shape, and a side wall portion 12B which is the "base-side leg for mounting", and formed so as to stand along the peripheral edge of the base portion 12B. The overall structure is configured substantially in a box-shape.

In a central portion of the base portion 12A of the bag holder 12, a penetration hole 14 having a large diameter is formed. An upper case 18 of inflator 16 which is formed in a flat substantially cylindrical shape, is inserted into the penetration hole 14 from the side opposite to the vehicle occupant side. A flange portion 20 which is formed in the axial direction center portion of the inflator 16, abuts the base portion 12A of the bag holder 12 at the side opposite to the vehicle occupant side, in a state in which the upper case 18 of the inflator 16 is inserted into the insertion hole 14. Bolt insertion holes 22 are formed at the four corners of the flange portion 20 and an equal number of bolt insertion holes 24 are formed in the base portion 12A of the bag holder 12 to correspond with the insertion holes 22.

A bag (an airbag) 26 which is folded so as to have a predetermined shape, is disposed on the surface at the vehicle occupant side of the base portion 12A of the bag holder 12. In FIG. 3, only a portion of the bag 26 is shown. In this bag 26, an opening 28 having a circular shape is formed. The upper case 18 of the inflator 16 is inserted into this opening 28. Further, a ring plate 30 is disposed at the peripheral edge portion of the opening 28 at the inner side of the bag 26. A plurality of bolts 32 which protrude from the ring plate 30 are inserted into the bolt insertion holes 24 in the bag holder 12 and into the bolt insertion holes 22 in the flange portion 20 of the inflator 16. By the nuts 34 being screwed with the insertion end portions of the bolts 32, the inflator 16 and the bag 26 are fastened together with (fixed to) the bag holder 12.

Here additional information about the inflator 16 is provided. In the case where the airbag apparatus is a mechanical ignition type, an acceleration sensor which detects when the vehicle is in a state of rapid deceleration, is disposed at a core axis portion of the lower case 36 of the inflator 16. In the case where the airbag apparatus is an electrical ignition type, airbag sensors which detects when the vehicle is in a state of rapid deceleration are disposed at a plurality of locations, such as the vicinities of the front wheels. When "airbag actuation" is determined at the center control unit, a predetermined amount of current flows to the ignition device which is disposed at the core axis portion of the upper case 36 of the inflator 16. Inside the inflator 16, an ignition agent, an inflammation agent, a gas generating agent and the like are disposed. By the acceleration sensor or the ignition apparatus being actuated, the ignition agent is ignited and the flames are spread to the gas generating agent by the inflammation agent. Further, by the gas generating agent being burned, a large amount of gas is ejected from the plurality of gas ejection portions 38 which are formed in the upper case 18.

The above-mentioned bag holder 12 is covered by a pad cover 40 so that it fits thereto. The pad cover 40 is formed of a resin material in a substantially box-shape. The top portion 40A of the pad cover 40 is disposed so as to face the vehicle occupant. At the top portion 40A, a pair of unfolding portions 44 are provided which due to a predetermined amount of inflation pressure being exerted by the air bags, break open from the break portions 42 and then unfold. Further, at the back surface of the pad cover 40 (i.e., the surface of the top portion 40A opposite to the vehicle occupant side) a mounting portion 40B as the "pad-side leg for mounting" is formed so as to stand.

A feature of the present embodiment, is the way in which the mounting portion 40B of the pad cover 40 is mounted to the side wall 12B of the of the bag holder 12 and a detailed description thereof follows.

Figure 1:
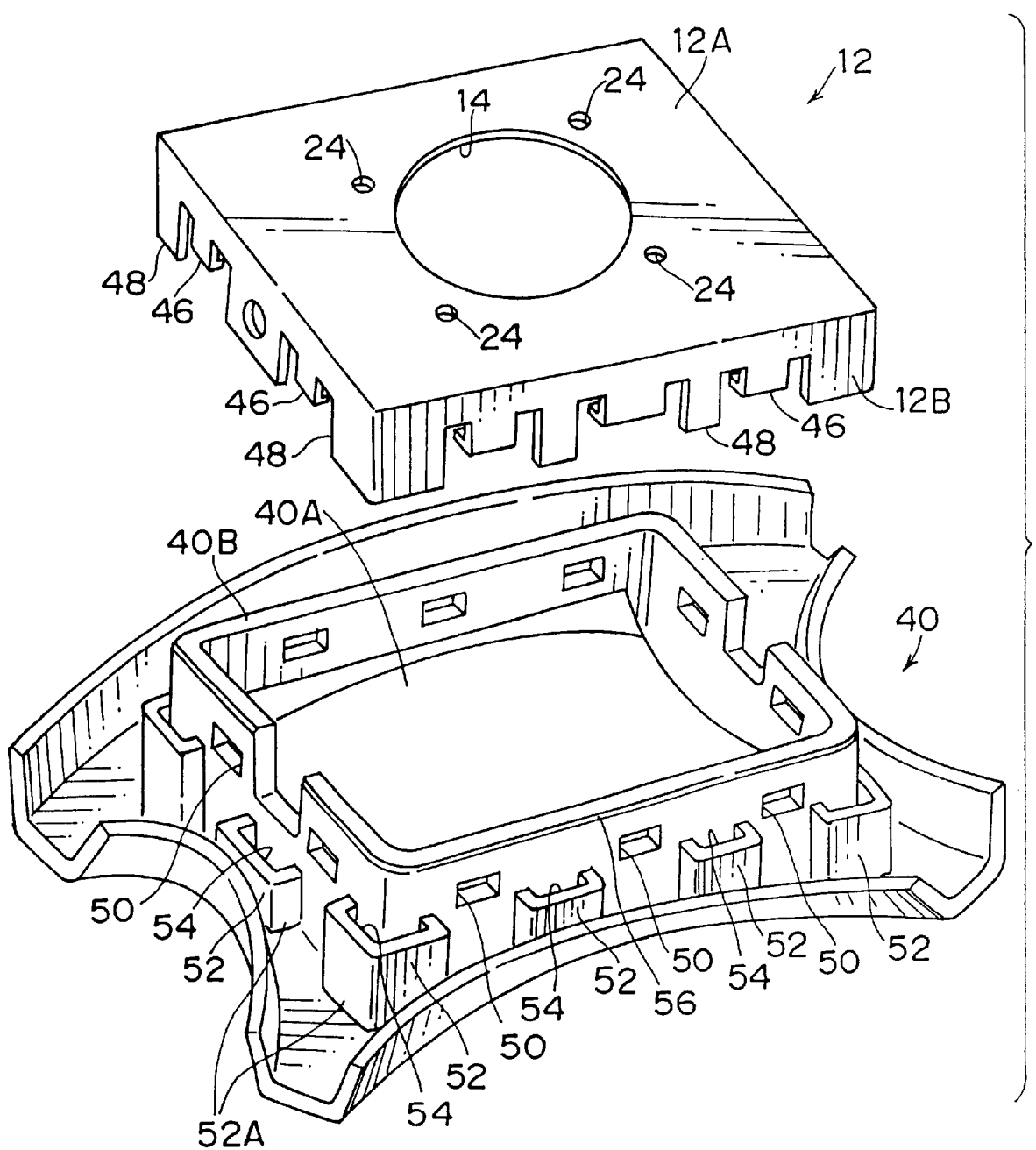
FIG. 1 is a perspective diagram illustrating a structure for fitting together a bag holder and a pad cover which are main portions of an airbag apparatus according to a first embodiment.
Figure 2:
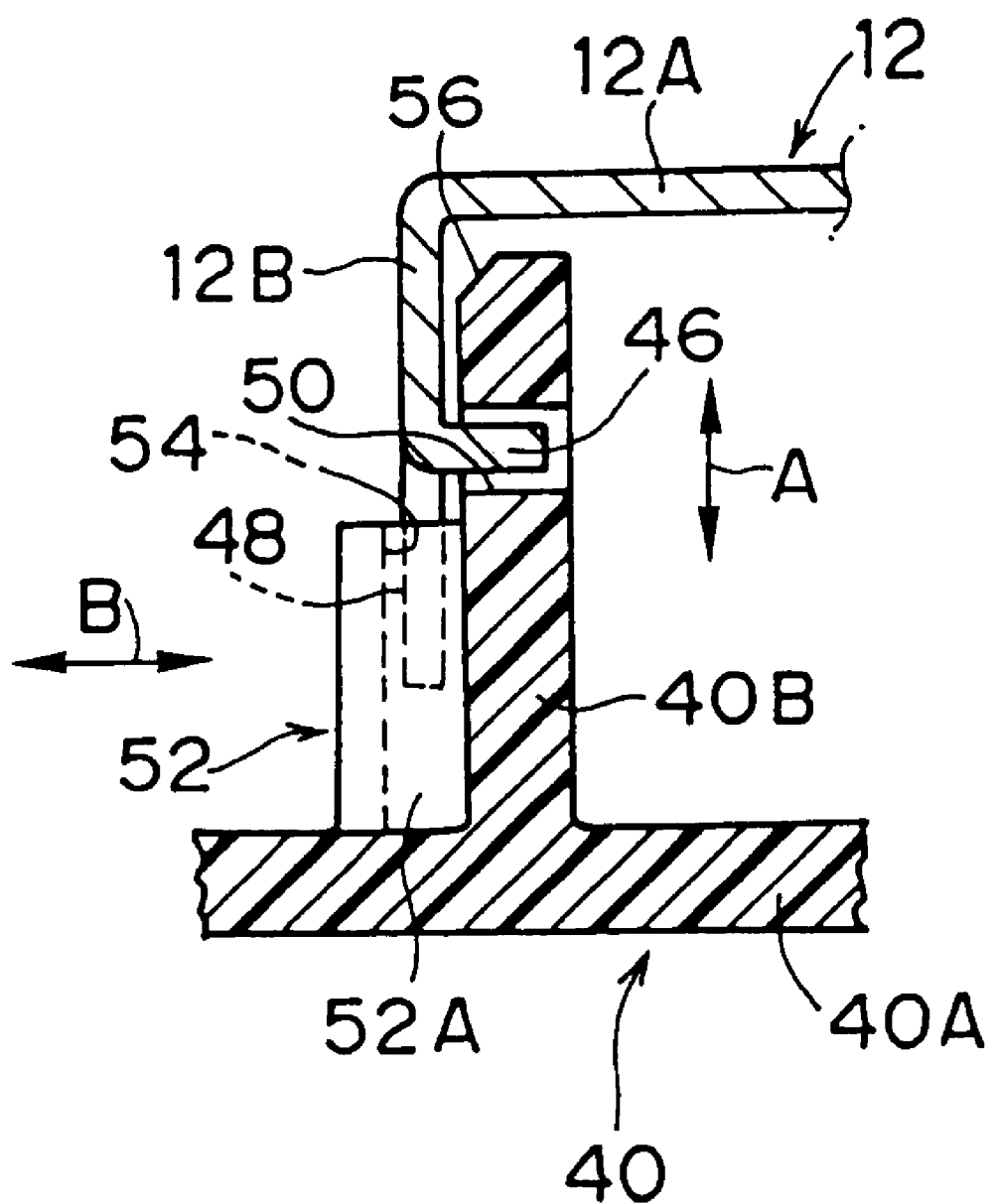
FIG. 2 is an enlarged cross-sectional main portion diagram of the pad cover and the bag holder shown in FIG. 1, in a state in which they are fit together.

As shown in FIG. 1 and FIG. 2, at the side wall 12B of the bag holder 12, engagement protrusions 46 which are composed of "engagement mechanisms" are formed so as to be spaced apart at an appropriate distance, by the distal end of the side wall 12B being bent to the inside. (That is to say, the cross-sectional configuration of the engagement protrusion 46 and the side wall portion 12B is, as illustrated in FIG. 2, substantially in an L-shape.) Further, insertion portions 48 are formed between the adjacent engagement mechanism 46. The insertion portions 48 are not bent inside, but protrude vertically from the base portion 12A. Note that the engagement protrusions 46 and the insertion portions 48 are integrally formed with the bag holder 12.

On the other hand, at the mounting portion 40B of the pad cover 40, a plurality of rectangular engagement openings 50 are composed of "engagement mechanisms" so as to correspond to the positions at which the engagement protrusions 46 of the bag holder 12 are formed. Engagement openings 50 are formed at a distal end portion side of the mounting portion 40B. Further, support walls 52 which correspond to the positions at which the insertions portions 48 are formed on the bag holder 12, are formed between the adjacent engagement openings 50. These support walls 52 formed having U-shaped cross sections or having angle-shaped configurations, are integral with the mounting portion 40B. Namely, both end portions, in a pad cover 40 circumferential direction (in a bending direction to which direction the support wall 52 is bent), of the support walls 52 are affixed to pad-side mounting leg portion. Note that the support walls 52 are formed at a base end portion side of the mounting portion 40B, and further, the base end portion 52A of the support wall 50 is integral with the back surface of the top portion 40A of the pad cover 40. By the support walls 52 being formed in a bridge shape on the outer side of the mounting portion 40B, the support walls 52 and the mounting portion 40B are spaced apart by a predetermined space 54 (the spaces 52 are formed). The dimension of this space 54 is set such that a small allowance is made for the plate thickness of the insertion portion 48. In addition, the entire external periphery (an external corner portion) of the distal end portion of the mounting portion 40B of the pad cover 40, is a taper guide 56 formed so as to taper at a predetermined angle.

Next, the operation and effect of the present embodiment will be described.

First, an outline of the order of assembly of the airbag apparatus of the present embodiment will be described briefly.

First, the pad cover 40 is inverted (the state shown in FIG. 1) and the bag 26 is mounted in a state in which it is folded inside the mounting portion 40B. At this time, the ring plate 30 has already been mounted on the peripheral edge portion of the opening 28 of the bag 26, and the bolts 32 of the ring plate 30 are in a state in which they protrude upwards. Next, the bag holder 12 is fit onto the pad cover 40, in the direction illustrated in FIG. 1.

Specifically, while the bolts 32 of the ring plate 30 are being inserted into the insertion holes 24 of the bag holder 12, the pad cover 40 is fitted onto the bag holder 12 so as to cover it. At this time, the engagement protrusions 46 of the bag holder 12, interfere with the taper guide 56 of the mounting portion 40B of the pad cover 40 and slides over the taper guide 56. Consequently, the mounting portion 40 which is formed of resin, elastically deforms toward the inside and at the time when the engaging protrusions 46 reach the engagement openings 50, they are both in a state of being engaged with each other. Further, at this time, the insertion portions 48 which are formed in the bag holder 12 are inserted between the mounting portion 40B of the pad cover 40 and the support walls 52 (spaces 54).

Subsequently, the bolts 32 of the ring plate 30 which protrude from the base portion 12A of the bag holder 12, are relatively inserted into the bolt insertion holes 22 formed on the flange portion 20 of the inflator 16. While this is being done, the upper case 18 of the inflator 16 is inserted into the penetration hole 14 of the bag holder 12. Then the ring plate 30 and the inflator 16 are fastened together, to the bag holder 12 by the nuts 34 being screwed onto the penetration end portion of the bolts 32.

Note that the above is simply a general order of assembly and the order of assembly of air bag apparatus 10 may differ from this one.

In the present embodiment, when the bag holder 12 is fit together with the pad cover 40 as described above, the engagement openings 50 formed on the mounting portion 40B of the pad cover 40 are elastically engaged with the engagement protrusions 46 formed on the side wall portion 12B of the bag holder 12. For this reason, the relative displacement of the side wall portion 12B of the bag holder 12 with respect to the mounting portion 40B of the pad cover 40 in the engagement and removal directions (the directions of arrow A in FIG. 2, namely, the directions of engagement and removal for the bag holder 12 and the pad cover 40) is regulated. Further, in the present embodiment, when the bag holder 12 is fit together with the pad cover 40, the insertion portions 48 of the bag holder 12 are inserted in the spaces 54 between the mounting portion 40B of the pad cover 40 and the support walls 52. As a result, the relative displacement of the mounting portion 40B of the pad cover 40 with respect to the side wall portion 12B of the bag holder 12 in directions orthogonal to above mentioned engagement and removal directions (the directions of Arrow B in FIG. 2, namely, the directions of engagement and removal for the engagement protrusions 46 and the engagement openings 50) is regulated. Consequently, when there is a rapid deceleration of the vehicle, the pair of unfolding portions 44 of the pad cover 40 unfold, and even if the mounting portion 40B attempts to elastically deform in the direction in which the engagement openings 50 separate from the engagement protrusions 46, the engagement openings 50 will not come apart from the engagement protrusions 46. Thus, a state in which the pad cover 40 is securely mounted to the bag holder 12 is ensured and the pad cover 40 which unfolds when a vehicle rapidly decelerates can be securely supported to the bag holder 12.

Further in the present embodiment, the mounting portion 40B of the pad cover and the support walls 52 which are provided thereat, carry out the role of the two wall portions of the prior art. That is to say, in the present embodiment, the two wall portions are formed at the pad cover 40 which is made of a resin. Thus when compared with the case in which two wall portions are provided to the side wall portion 12B of the bag holder 12 which is formed of metal, the manufacturing work is considerable facilitated. Further since the manufacturing work is facilitated, work accuracy is increased and this allows for the assembly process to be improved. Further, in the present embodiment, as described above, because the two wall portions are formed of resin, the airbag apparatus 10 is lighter than the airbag in which the two wall portions are formed of metal.

In addition, in the present embodiment, since the base end portions 52A of the support walls 52 which are formed on the mounting portion 40B are integrally formed with the back surface side of the top portion 40A of the pad cover 40, the strength of the support wall 52 is increased. As a result, in the present embodiment, the effect of regulating relative displacement of the mounting portion 40B of the pad cover 40 with respect to the side wall portion 12B of the bag holder 12 in the directions orthogonal to above mentioned engagement and removal directions (the directions of Arrow B in FIG. 2, namely, the directions of engagement and removal for the engagement protrusions 46 and the engagement openings 50) can be further ensured. In other words, when the mounting portion 40B of the pad cover 40 which is engaged with the side wall portion 12B of the bag holder 12 elastically deforms in the direction in which unfolding portion 44 of the pad cover 44 unfolds, the release of the state in which they are engaged is hindered.

Further, in the present embodiment, a taper guide 56 is formed along the entire external periphery (outer edge portion) of the distal end portion of the mounting portion 40B of the pad cover 40. Consequently the assembly work is improved.

Also, in the present embodiment, because the structure is such that the engagement protrusions 46 are formed on the bag holder 12 which is made of metal, the state in which the pad cover 40 is engaged with the engagement openings 50 is firmly fixed.

A Second Embodiment

Next, a second embodiment of the present invention will be described with reference to FIG. 4 and FIG. 5. Portions identical to those of the first embodiment will be denoted by the same reference numbers and description thereof will be omitted.

Figure 4:
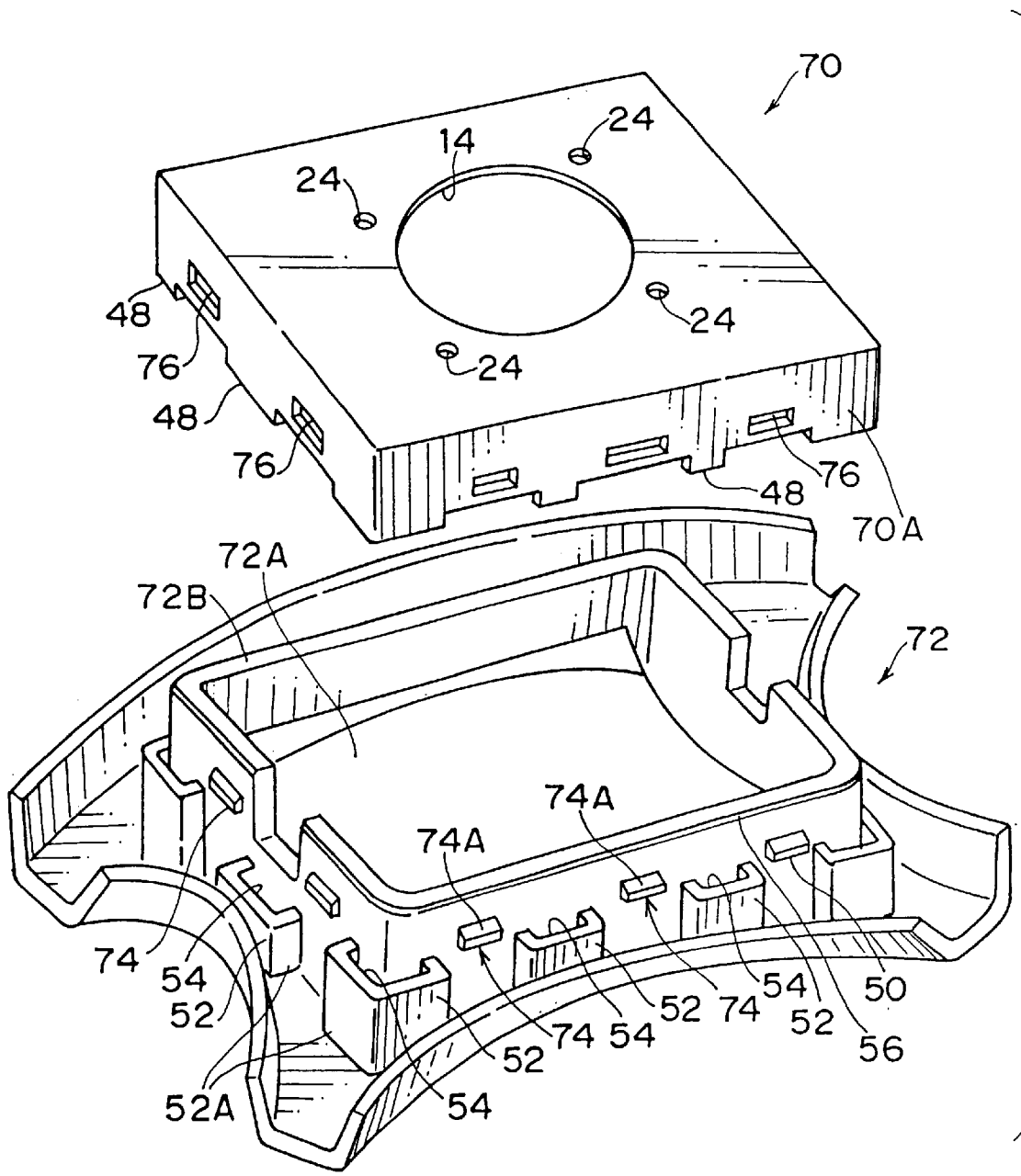
FIG. 4 is a perspective diagram, corresponding to FIG. 1, of the main portions of the airbag apparatus according to a second embodiment.
Figure 5:
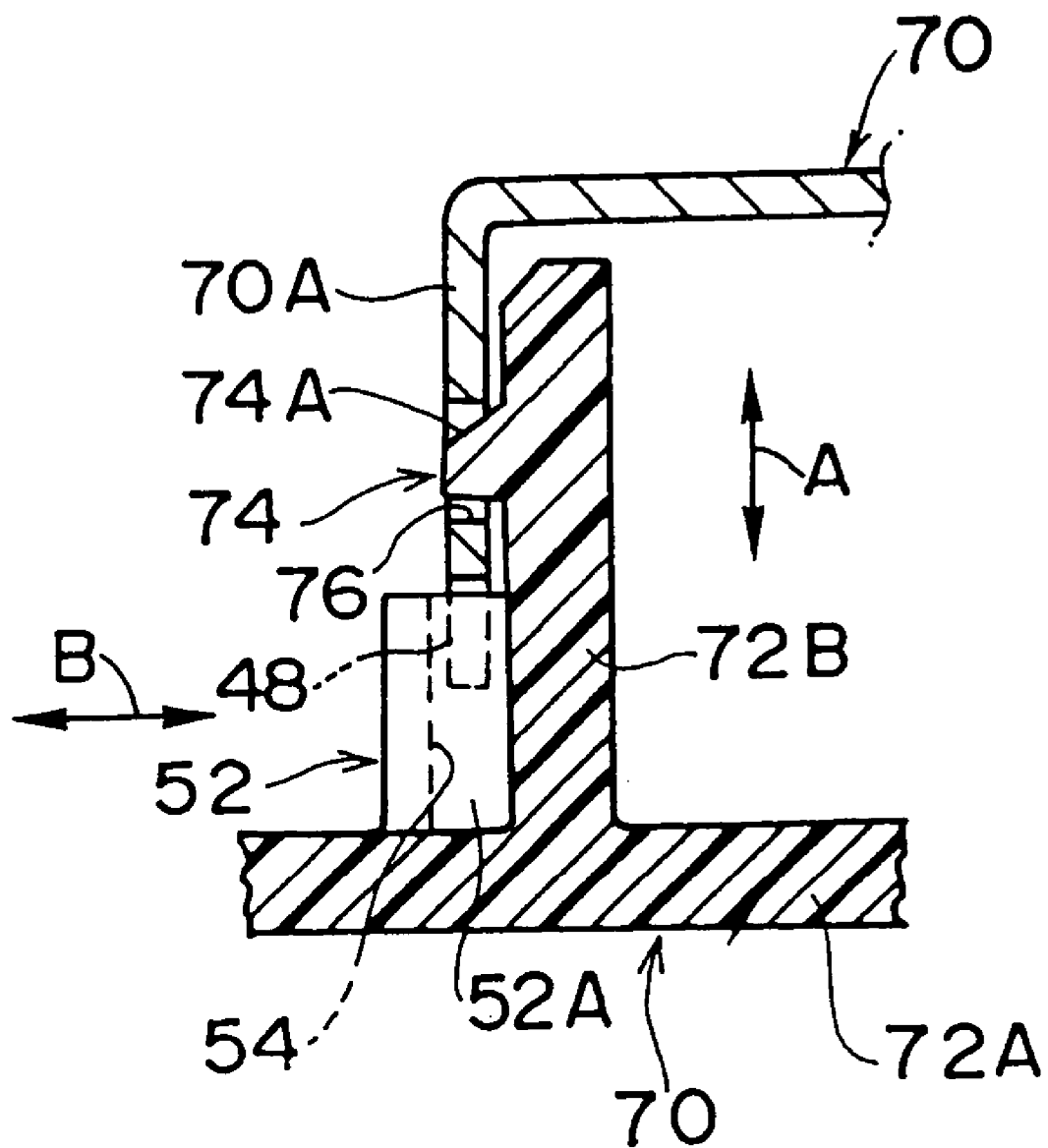
FIG. 5 is an enlarged cross-sectional diagram, corresponding to FIG. 2, of the pad cover and the bag holder in a state in which they are fitted together as shown in FIG. 4.
Figure 6:
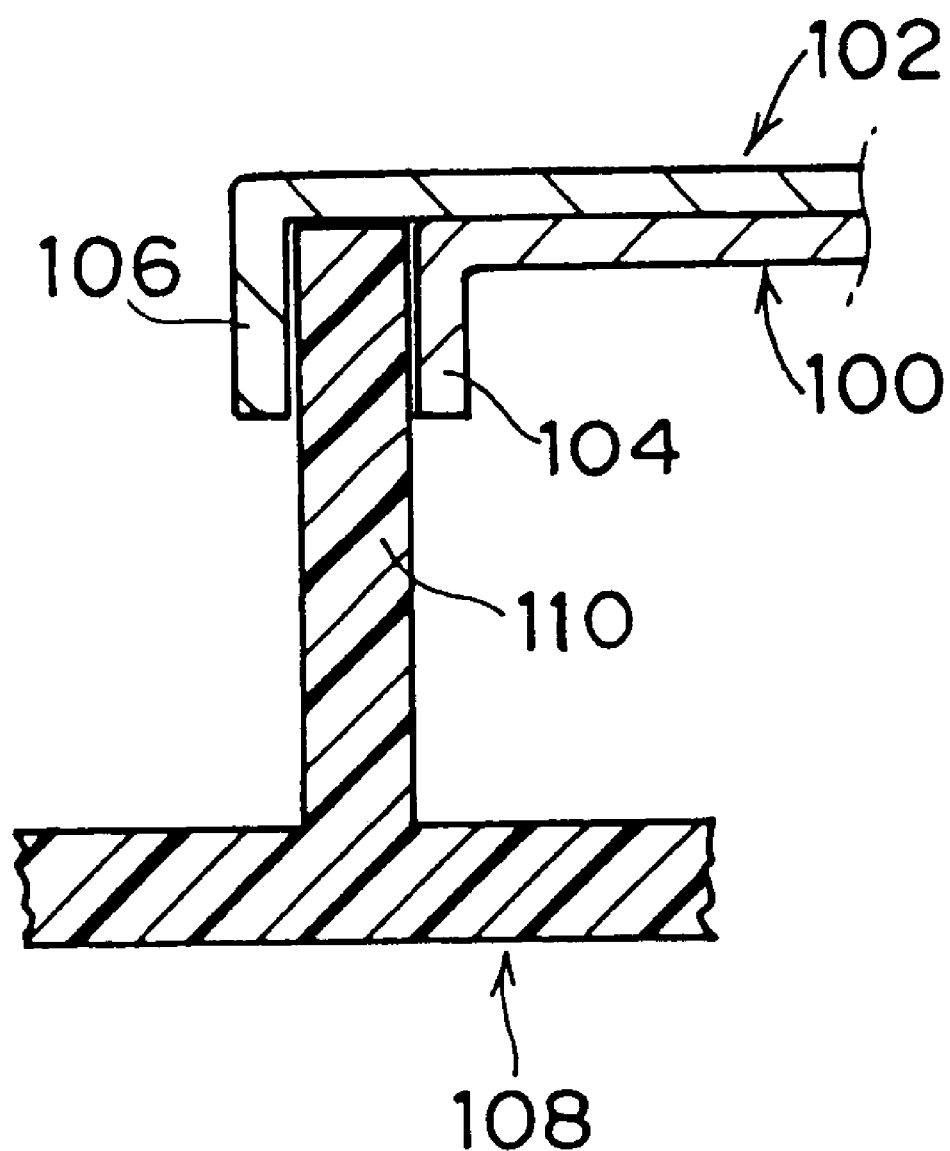
FIG. 6 is an enlarged cross-sectional main portion diagram illustrating the fixing structure of the pad cover and the bag holder according to a conventional example.

In FIG. 4, the bag holder 70 and the pad cover 72 of the airbag apparatus of the present embodiment are shown in a state in which they are inverted. In FIG. 5, an enlarged longitudinal sectional structure of the main portions of the airbag apparatus is illustrated.

As illustrated in these diagrams, converse to the above-described first embodiment, a feature of the present embodiment is that the engagement protrusions 74 which are "engagement mechanisms", are formed on the mounting portion 72B which is the "pad-side mounting leg portion". The engagement openings 76 which are "engagement mechanisms" into which the engagement protrusions 74 are engaged, are formed on the side wall portion 70A which is the "base-side mounting leg portion" of the bag holder 70.

In view of the assembly of the bag holder 70 with the pad cover 72, the engagement protrusions 74 are formed in a substantially (right-angled) triangular configuration when seen from the side. Accordingly, in the present embodiment, the inclined surfaces of the engagement protrusions 74A perform the same role as the tapered guide 56 of the above-described first embodiment.

The operation and effect of the above-described first embodiment can also be attained with this structure.

Further in the present embodiment, since the structure is such that the engagement openings 76 are formed on the metal bag holder 70, it suffices to carry out the punching operation only on the metal bag holder 70 and the bending process for forming the engagement protrusions is no longer necessary. Accordingly, the formation of the bag holder 70 is facilitated.

In the above-mentioned first embodiment, a taper guide 56 is provided along the entire external periphery of the mounting portion 40B of the pad cover 40. However, the structure is not limited to this structure, and may have a structure in which the taper guide 56 is provided only at the portions which interfere with the engagement protrusions 46.

Further, in both of the above-mentioned embodiments, a structure is adopted in which the base end portions 52A of the support walls 52 are integral with the back surface of the pad covers 40 and 72, but they do not necessarily need to have such a structure. For example, the structure may be such that the base end portions of the support walls which are configured in the shape of a bridge are integrally formed with the outer surface of the mounting portions 40B and 72B in a state in which they away from the back surfaces of the top portions 40A and 72A of the pad covers 40 and 72.

Further, the in the above-mentioned embodiments, the bag holders 12 and 70 are formed of metal, but they may also be formed of a hard resin. It suffices for the bag holders to be formed of a hard material.

As described above, the air bag device according to the first aspect of the present invention comprises: an engagement mechanism which engages the pad-side mounting leg portion and the base-side mounting leg portions with each other; an obstruction mechanism which includes: spaces which are formed between the pad-side mounting leg portion and support walls provided at the pad-side mounting leg portion and; insertion portions, which are inserted into the spaces provided on the base-side mounting leg portion; such that a releasing of an engagement state of the pad-side mounting leg portion and the base-side mounting leg portion is prevented due to elastic deformation in an unfolding direction of the unfolding portion of the pad cover.

Accordingly, secure mounting of the pad cover to the base member is ensured, the manufacturing work is considerably facilitated.

In the air bag device of the second aspect of the present invention according to the first aspect, the engagement mechanism is formed of engagement protrusions which are formed on one of the base-side mounting leg portion and the pad-side mounting leg portion, and engagement openings which are formed on the other of the base-side mounting leg portion and the pad-side mounting leg portion, such that the engagement protrusions can engage with engagement openings. Accordingly, in a case where the engagement protrusions are formed on the base-side mounting leg portion, the engagement protrusions and the openings are in a state in which they are firmly fixed. On the other hand, in a case where the openings are formed on the base-side mounting leg portion, the manufacturing work for the base-side mounting leg portion is considerably facilitated.

In the air bag device of the third aspect of the present invention according to the first or the second aspect, the base end portions of the support walls are integrally formed with the surface which is opposite to the vehicle occupant side (back side) of the pad cover. Accordingly, the strength of the support walls is increased, therefore, a releasing of an engagement state of the pad-side mounting leg portion and the base-side mounting leg portion, due to elastic deformation in an unfolding direction of the unfolding portion of the pad cover, is surely prevented.

What is claimed is:

1. An airbag apparatus comprising:
    a high rigidity base member including: a base portion to which an inflator which ejects gas when a vehicle rapidly decelerates and a bag which is inflated by the gas are fixed; and a base-side mounting leg portion which is provided at the base portion; and
    a pad cover formed of resin including: a top portion which houses the bag between the base portion of the base member and the top portion, and which is provided with an unfolding portion which breaks open and unfolds when an inflation pressure exerted by the bag exceeds a predetermined value; and a pad-side mounting leg portion which is affixed to the base-side mounting leg portion provided on a surface which is opposite to a vehicle occupant side of the top portion;
    wherein said airbag apparatus further comprises:
        an engagement mechanism which connects the pad-side mounting leg portion and the base-side mounting leg portions with each other, wherein said engagement mechanism is formed of engagement protrusions which are formed on one of the base-side mounting leg portion and the pad-side mounting leg portion, and engagement openings which are formed on the other of the base-side mounting leg portion and the pad-side mounting leg portion, such that the engagement protrusions can engage with engagement openings; and
        an obstruction mechanism which includes:
            spaces which are formed between the pad-side mounting leg portion and support walls provided at the pad-side mounting leg portion and;
            insertion portions, which are inserted into the spaces, provided on the base-side mounting leg portions, said insertion portions being mechanically separate from said engagement mechanism;
            such that a releasing of a connection state of the pad-side mounting leg portion and the base-side mounting leg portion by the engagement mechanism, due to an elastic deformation in an unfolding direction of the unfolding portion of the pad cover, is prevented.

2. The airbag apparatus of claim 1 wherein, the base end portions of the support walls are integrally formed with the surface which is opposite to the vehicle occupant side of the pad cover.

3. The airbag apparatus of claim 1 wherein, the obstruction mechanism obstructs a movement of the insertion portion in directions orthogonal to engagement and removal directions of the pad-side mounting leg portion and the base-side mounting leg portion.

4. The airbag apparatus of claim 1 further comprising a guide member which guides an engagement of the pad cover and the base member.

5. The airbag apparatus of claim 4 wherein, the guide member is a taper portion which is provided at a distal end portion of the pad-side mounting leg portion, and guides an engagement of the engagement protrusion formed at the base-side mounting leg portion with the engagement hole formed at the pad-side mounting leg portion.

6. The airbag apparatus of claim 4 wherein, the guide member is the engagement protrusion shaped triangular when viewed from the side, which is formed on the pad-side mounting leg portion, and guides an engagement of the engagement protrusion with the engagement hole which is formed on the base-side mounting leg portion.

7. The airbag apparatus of claim 4 wherein, both end portions, in a pad cover circumferential direction, of at least one of the support walls are affixed to pad-side mounting leg portion.

* * * * *